3,721,586
METHOD OF REMOVING WATER FROM
LITHIUM BATTERIES
Raymond J. Jasinski, Boston, and Lewis H. Gaines,
Framingham, Mass., assignors to Tyco Laboratories,
Inc., Waltham, Mass.
Filed Apr. 1, 1971, Ser. No. 130,279
Int. Cl. H01m 1/00
U.S. Cl. 136—175  6 Claims

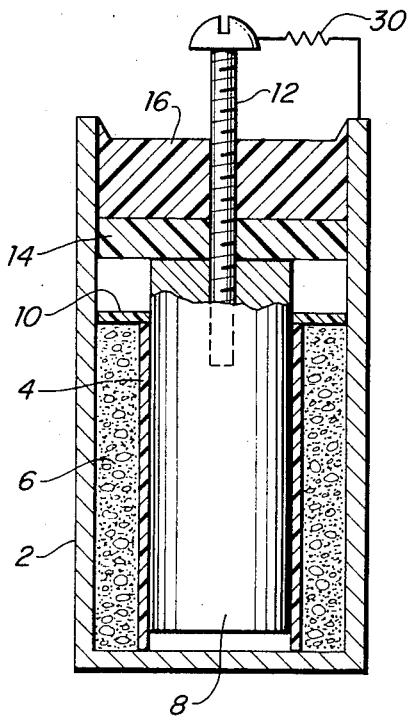
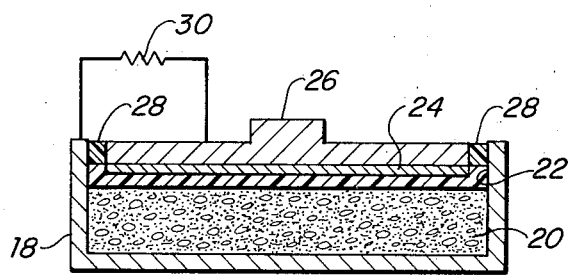
FIG. 2.
FIG. 1.
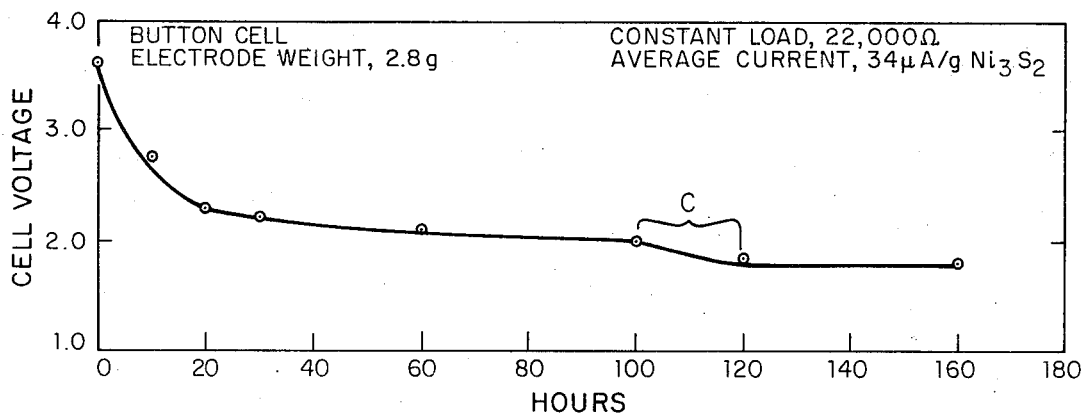
FIG. 3. ELECTROCHEMICAL DISCHARGE OF THE FINAL TRACES OF WATER FROM Li/NICKEL SULFIDE CELLS
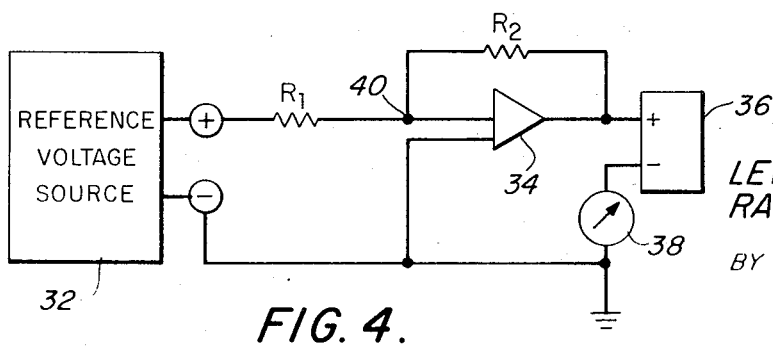
FIG. 4.
LEWIS H. GAINES
RAYMOND J. JASINSKI
INVENTORS.
BY Schiller & Pandiscio
ATTORNEYS.

ABSTRACT OF THE DISCLOSURE

An improvement in the manufacture of lithium batteries, the improvement comprising electrolytically converting trace water to hydrogen gas and venting said gas before the batteries are sealed.

This invention relates to lithium batteries and more particularly to an improvement in cells of the type comprising lithium anodes in nonaqueous electrolytes.

A variety of batteries employing negative electrodes comprising lithium are known (as exemplified by U.S. Pats. 3,043,896, 3,248,265, 3,279,952, 3,380,855, 3,393,-092, 3,393,093, 3,415,687, 3,243,242, and 3,508,966) and a number of different cathodes and electrolytes have been used in attempts to produce lithium batteries with good shelf life as well as high energy densities. Particular improvements have been the use of cathodes comprising $Ni_3S_2$ or $NiS_2$ or a mixture of one of the foregoing compounds or NiS and a conductive binder in the form of aluminum fibers or powders (see our copending application Ser. No. 852,557, filed Aug. 25, 1969 or the copending application Ser. No. 852,645 of Raymond Jasinski, filed Aug. 25, 1969 which is now abandoned). Use of such cathodes together with appropriate nonaqueous electrolytes has resulted in lithium batteries having improved shelf life coupled with satisfactory shelf life and operation life at temperatures as low as −29° F. and as high as 160° F. However, it is recognized in the art that satisfactory performance is contingent upon elimination of water from the cells. If any water is present, it will react with the lithium to produce hydrogen gas at the anode and the resulting gas pressure can be great enough to deform the cell structure and rupture the cell seals. Accordingly, the customary practice is to attempt to keep moisture out of the cells by predrying the positive and negative plate materials, the electrolyte, and the separator before assembling and fabricating the cells in a dry atmosphere. This approach of keeping moisture out of the cells requires great care in order to eliminate substantially all traces of water. However, even though great care is taken to keep everything scrupulously dry, some cells will still contain traces of water, with the result that their discharge behavior is less stable than that of cells that have no residual moisture.

Accordingly, the primary object of this invention is to provide an improved method of removing trace water from lithium batteries during the manufacture thereof.

A further object is to provide improved lithium batteries.

A more specific object is to provide an improvement in the art of making batteries of the type comprising lithium as the active anode material and $Ni_3S_2$ or NiS as the active cathode material.

The foregoing objects and other objects hereinafter rendered obvious are achieved by a method which essentially comprises cathodically discharging trace water immediately prior to sealing the battery. Other features and advantages of the invention are set forth in the following detailed specification which is to be considered together with the accompanying drawing wherein:

FIGS. 1 and 2 illustrate two different forms of lithium batteries from which water is removed in accordance with the present invention;

FIG. 3 illustrates changes in cell voltage as final traces of moisture are electrochemically discharged from a lithium-$Ni_3S_2$ cell prior to sealing; and FIG. 4 is a schematic illustration of a form of potentiostat arrangement that may be employed in practicing the invention.

If trace water is present in the organic electrolyte of a sealed lithium battery, pressure will build up as a result of hydrogen generated at the lithium electrode on wet stand (i.e. when the lithium electrode is in contact with the electrolyte) as a result of the following chemical reaction:

$$Li + H_2O \rightarrow LiOH + \tfrac{1}{2} H_2 \tag{1}$$

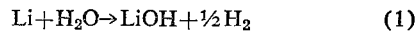

As indicated, depending upon the amount of water present, the hydrogen gas pressure may be great enough to deform the cell or rupture its seal, with the result that the cell will leak and the battery life will be foreshortened. In accordance with the present invention, this problem is avoided by electrochemically discharging trace water prior to sealing the cell.

Essentially, the invention consists of allowing a current to pass through the cell (after its components have been assembled but before sealing is completed) to cause the following electrochemical reaction to occur at the positive electrode:

$$e^- + H_2O \rightarrow OH^- + \tfrac{1}{2} H_2 \tag{2}$$

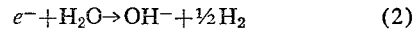

The hydrogen that is generated by the foregoing reaction is allowed to escape from the cell and then the cell is sealed.

Reaction (2) takes place at a voltage of between approximately 2.15 and approximately 1.90 volts (versus Li/Li+). Accordingly, the invention is applicable primarily to a cell in which the positive electrode discharges below about 1.90 volts versus Li/Li+. However, it also may be used with a battery having a positive electrode that discharges above about 1.9 volts if the battery is electrochemically rechargeable, since any consumption of positive plate material occurring during the dewatering operation can be offset by recovery during recharging. It also may be used with cells in which the positive electrode discharges below 2.15 volts but slightly higher than 1.90 volts, but only if the amount of trace water is sufficiently small to enable it to be discharged as hydrogen before any significant amount of positive plate material is consumed.

Lithium batteries in which the active cathode material is $Ni_3S_2$ are particularly suited for treatment according to the present invention since if the average current through the cell is kept low, $Ni_3S_2$ does not discharge (i.e. is not reduced to Ni metal and sulfide ions) until the cell voltage is below the level at which reaction (2) occurs. For the purpose of this specification, the average cell current is considered to be "low" if it requires at least about 500 hours to fully discharge the cell. The invention is also applicable to lithium batteries in which the active cathode material is NiS since this species of nickel sulfide begins to discharge at about 2.0 volts or less. However, with Nis it is imperative to closely control the duration as well as the magnitude of current flow through the cell. The current is terminated before the cell voltage reaches 1.90 volts (preferably at about 1.95 volts) so as to discharge most of the water without discharging any substantial amount of NiS. The discharge potentials of the cathode material are independent of the electrolyte composition provided that (as in the batteries described below) the electrolyte does not react chemically with the cathode.

FIGS. 1 and 2 show two types of lithium batteries which may be treated in accordance with the present invention. Referring now to FIG. 1, the illustrated battery is a LeClanche-type cell which comprises a cylindrical aluminum can 2 that serves as both the cell container and the positive terminal. The can also may be made of some other conductive material that is not corroded by the electrodes or electrolyte; e.g., a nickel-plated steel. Mounted within the cell is a cylindrical separator sleeve 4 made of an ionically permeable electronically insulating material that allows ionic conduction between the negative and positive plate materials while physically separating the two so as to prevent direct electronic conduction. The separator preferably is made of coarsely woven glass fiber sleeving. A substitute material for the separator is a plastic fabric such as a polypropylene mat having small pores or openings therein just large enough to make it permeable to ions but not large enough to permit through flow of positive plate material. Other materials known to be capable of serving as ion permeable membranes also may be used. The space between the separator sleeve 4 and the side wall of can 2 is filled with a paste 6 made up of the positive material and the electrolyte, the positive material comprising a nickel sulfide (preferably $Ni_3S_2$) and the electrolyte comprising an ionizable salt such as lithium perchlorate or potassium hexafluorophosphate in an aprotic organic solvent such as propylene carbonate. The positive material may also include a conductive binder such as nickel or aluminum or carbon in particulate form, although a conductive binder is not required if the active positive material is $Ni_3S_2$ since the latter is an electronic conductor. NiS is an electronic insulator and thus a binder is required. Tetrahydrofuran also may be added to the paste for low temperature operation. Other electrolyte compositions as described in U.S. Pats. 3,248,265, 3,043,-896, and 3,423,242 may also be used. The negative electrode, i.e., the anode, is in the form of a rod 8 which is disposed within the separator 4 in direct contact therewith. The negative electrode preferably is lithium metal. However, it may also be an amalgam or alloy of lithium with some other material; e.g. an alloy of lithium with zinc, silver, or magnesium as suggested in U.S. Pats. 3,248,265, 3,415,687, and 3,043,896. A retaining washer 10 made of a suitable electrically insulating material, such as Teflon or other inert substance, is slipped over the lithium rod 8 in engagement with the end of separator 4. The washer 10 makes a snug friction fit so as to retain the paste 6. The upper end of the rod 8 is fitted with a conductive pin 12 that projects from the can 2 and serves as the negative terminal of the battery. By way of example, pin 12 may be made of nickel plated steel or stainless steel. A second washer 14 made of a suitable insulating material, such as Teflon or other inert substance, is mounted within the can 2 over the pin 12 up against the outer end of the negative electrode. Sealing of the cell is accomplished by applying a suitable insulating potting compound as shown at 16 over the washer 14. Various conventional potting compounds may be used, such as a flexible polysulfide/ epoxy adhesive or a rigid alumina-filled adhesive cement.

FIG. 2 illustrates a button type cell which may be processed according to the invention. The cell comprises a thin-walled shallow metal case 18 made of a conductive metal such as aluminum so as to serve as the positive terminal. The case is partially filled with a composition 20 comprising positive plate material soaked with electrolyte. The positive plate material comprises a selected nickel sulfide (preferably $Ni_3S_2$) and a conductive binder of the nature described formed as a dry mixture and pressed into the case. The electrolyte (having a composition as described above) is added to the positive material after the latter has been pressed into the case. The layer of positive material is porous and hence absorbs the electrolyte. Also disposed in the case is a cup-shaped member 22 adapted to function as a cell separator and electrolyte retainer. The member 22 is made of an insulating material that permits ionic but not electronic conduction between the positive and negative plate materials. Preferably, it is made of a non-woven polypropylene mat. Disposed on top of and in contact with the member 22 is an electrode 24 which may be made of lithium or a lithium alloy as the rod 8. Preferably electrode 24 is made from lithium foil. A contact member 26 made of a conductive material that is not corroded readily by lithium is placed on top of the lithium electrode and secured in place by a suitable potting compound 28. Preferably, the contact member is made of magnesium metal. However, it also may be made of other noncorrosive material such as brass, nickel plated steel, or stainless steel. The contact member serves as the negative terminal of the cell.

In acordance with the present invention any trace water is removed from the cells of FIGS. 1 and 2 after all of their components have been assembled but before the cells are sealed by application of the potting compounds shown at 16 and 28. In the absence of the potting materials 16 and 28, any hydrogen gas evolved by reaction (2) will readily pass out between the cell cases 2 and 18 and members 10, 14 and 24 respectively. The sealing compounds 16 and 28 are applied after gassing has ceased. Electrochemical discharge of trace water by reduction to hydrogen gas may be accomplished by allowing a current to pass through the cell. This may be achieved, for example, by connecting a fixed load resistor of suitable value across the terminals of the cell or by connecting the cell terminals to a potentiostat-type device.

Use of a resistor is represented schematically by the resistor 30 of FIGS. 1 and 2. Once the resistor 30 is connected, a current will flow through the cell and this current will cause trace water to be converted to hydrogen gas according to reaction (2) above. Since the cell is not sealed, the hydrogen gas will be vented from the cell. The magnitude of the current flowing through the cell will depend upon the resistive load presented by resistor 30 and the cell voltage. The cell voltage can be monitored by coupling a voltmeter across the resistor and the current can be monitored by means of an ammeter or determined by calculation from the value of the resistor and the measured cell voltage.

In batteries of the type described above embodying $Ni_3S_2$, the positive plate material tends to discharge at low average current rates at a potential of about 1.45 volts versus $Li/Li+$. However, if the positive plate material is heated in air or oxygen, preferably for about 15 minutes at a temperature of about 325° C., before it is wet with electrolyte, its coulombic capacity is increased substantially and in addition it will discharge at a potential close to 1.90 volts rather than about 1.45 volts at a low current rate. In the case of a battery like that shown in FIG. 2, the positive plate material may be heated before or after it is pressed into the battery case. Since $Ni_3S_2$ treated in this manner will discharge at about 1.90 volts, water may be discharged from a battery embodying such treated $Ni_3S_2$ in accordance with the present invention without discharging any positive plate material.

The invention is best understood by the following example which is provided for purpose of illustration and is not intended to limit the invention. In this example, electrochemical discharge of trace water was effected from a button cell made according to the design of FIG. 2. The cell had an aluminum case 18, and the separator 22 was made from non-woven polypropylene mat about 0.009 inch thick. The lithium electrode 24 was punched from 0.040 inch lithium foil. The positive plate was prepared by pressing 2.8 grams of a mixture of 80 wt. percent $Ni_3S_2$ and 20 wt. percent aluminum fibers into the bottom of the case at a pressure of 100 lb./cm.² Just before it was pressed into the case, the positive plate mixture was heated in air at 325° C. for about 15 minutes. The aluminum fibers measured approximately 0.005 inch x 0.005 inch in cross section and 0.125 inch to 0.25 inch long. The positive plate had an area of about 5 cm.$^2$. The electrolyte consisted of a 1 M solution of lithium perchlorate in propylene carbonate. The positive plate material was saturated with this electrolyte. The magnesium contact 26 was held in place without application of sealing compound 28.

Current flow through the cell was initiated by coupling a 22,000 ohm resistor between the can 18 and the magnesium contact 26. The cell voltage and current were monitored periodically during the time that the cell was subjected to current flow. The average current was 34 μamp per gram of $Ni_3S_2$ and the average current density was about .015 ma./cm.$^2$. Initially, the cell voltage was substantially in excess of the voltage expected from the $Li/Ni_3S_2$ couple but dropped steadily during the first 24 hours to a level close to that at which reaction (2) occurs. This initial relatively sharp drop in cell voltage was believed due to the presence of impurities (other than water) which are reduced as a result of the current flow in the cell. After the initial relatively sharp drop, the cell voltage stabilized, dropping slowly from about 2.15 to about 2.0 volts in the period from about 24 hours to about 100 hours of current flow. Thereafter, the cell voltage dropped to about 1.8 volts and remained substantially at that level until current flow was discontinued (by removal of the load resistor) after 160 hours of current flow. FIG. 3 illustrates the foregoing changes in cell voltage. It has been determined that hydrogen gas commenced to be discharged after about the first 24 hours of current flow and continued to be generated until after about 110 hours. Thereafter, with the cell voltage holding at about 1.8 volts, $Ni_3S_2$ positive plate material began to discharge. In practice, the flow of current through the cell is discontinued when production of hydrogen from trace water comes to an end, preferably during the interval identified by the letter C in FIG. 3 when the cell voltage commences to drop from the plateau characteristic of trace water discharge to the level at which positive plate material begins to discharge. Sealing is accomplished as soon as possible after current flow through the cell has terminated. It is to be noted that if a button cell were made and subjected to current flow as in the foregoing example but without pre-heating the positive plate in air, the cell voltage behavior would be the same as in FIG. 3 except that after the trace water was discharged the cell voltage would drop to about 1.45 volts.

On a production basis, the above described method can be practiced by monitoring the voltage of each cell and discontinuing current flow when the cell voltage drops to the level at which positive plate material begins to discharge. Preferably, however, the method is carried out on a time basis, i.e. each cell is subjected to current flow via a predetermined constant load such as resistor 30 for a fixed period of time which has been determined by prior tests on prototype cells of the same design to be required to discharge substantially all trace water without discharging any positive plate material.

It is to be noted that the time required to electrochemically discharge all traces of water in the cell can be decreased by increasing the current density. Obviously this can be achieved by using a smaller load resistor 30. At higher current densities the transition between the water plateau (2.15 to 1.90 volts) and the oxidized $Ni_3S_2$ potential becomes less sharp than what is shown at C in FIG. 3. It has been found also that if the current density is too high, positive plate material will start to be consumed before all trace water has been discharged. In the case of $Ni_3S_2$ or NiS, the positive plate material will begin to be consumed before electrochemical discharge of water has been completed if the current density exceeds about 0.5 ma./cm.$^2$. Accordingly, in the practice of this invention the average current through the cell is controlled so as not to exceed a current density of about 0.5 ma. per sq. cm. of positive plate surface area. The point at which current flow through the cell is to be terminated can be determined by periodically checking cell voltage.

The process is also applicable to cells where the positive electrode material is NiS since at a low average cell current this material will discharge at about 2.0 volts or less relative to Li/Li+. It is not applicable to lithium cells having an $NiS_2$ cathode since $NiS_2$ discharges above 2.0 volts and such cells are not rechargeable.

This invention also may be practiced by using a potentiostat-type device to allow current to pass through the cell. This mode of practicing the invention is illustrated in FIG. 4. Essentially, the potentiostat-type arrangement comprises a source of reference voltage 32 which provides a stable D.C. reference voltage that is less than 2.15 volts but is greater than the voltage at which the positive plate material in an Li-nickel sulfide cell begins to discharge. The negative terminal of the voltage source is grounded, while its positive terminal is connected through a fixed resistor $R_1$ to one input terminal of an operational amplifier 34. The other input terminal of amplifier 34 is grounded. The output terminal of amplifier 34 is connected to the positive plate of the cell 36 from which trace water is to be removed, while the negative plate of the same cell is tied to ground through an ammeter 38. A feedback resistor $R_2$ is connected between the amplifier's output terminal and the amplifier's input terminal to which resistor $R_1$ is connected (see junction 40). Resistors $R_1$ and $R_2$ have the same values. Accordingly, as is well known to persons skilled in the art of operational amplifiers, amplifier 34 maintains identical currents through $R_1$ and $R_2$ (so that junction 40 becomes a virtual ground) and hence, holds the positive electrode of the cell at the level of the reference voltage. With this arrangement, current flows through the cell to electrochemically consume trace water and release hydrogen gas. Current flow through the cell is monitored by ammeter 38. Since the cell is effectively clamped to the reference voltage, current flow through the cell and ammeter will be relatively high at the outset and will then drop as the amount of trace water in the cell is diminished. The advantage of using the arrangement of FIG. 4 is that the time required to eliminate water from the cell is much shorter due to the fact that the current density starts off high and then drops according to how much moisture is left in the cell. Whether or not current flow stops when all of the water has been consumed depends upon the potential at which the positive plate material will commence to discharge and the value of the reference voltage to which the cell is clamped. If the positive plate material is $Ni_3S_2$ and the reference voltage is about 1.95 volts, the cell current will drop to zero after all of the water has been eliminated and thereafter no more current will flow since the cell is clamped to a voltage greater than that at which $Ni_3S_2$ discharges. On the other hand, if the positive plate material is NiS, avoidance of discharge of positive plate material is accomplished by setting the reference voltage between 2.15 and 2.0 volts, in which case reaction (2) will proceed at a slower rate and complete discharge of trace water will take a longer period of time; alternatively, the reference voltage is set at about 1.95 volts and the cell is disconnected (a) after a period of time which is sufficient (as determined by prior tests) to eliminate substantially all traces of water without at the same time discharging any substantial amount of positive plate material, or (b) when the current drops to a minimal level indicative of the fact that substantially all water has been discharged as $H_2$ gas.

What is claimed is:

1. Method of removing trace water from a lithium battery comprising assembling in an open container a cell having a negative plate comprising a lithium metal, a non-aqueous electrolyte, and a positive plate that discharges at a potential less than about 2.0 volts versus Li/Li+; coupling said positive and negative plates to allow current to pass through said cell so as to decompose any water present in said cell to hydrogen, and venting said hydrogen; terminating the flow of said current when substantially all of said water has been decomposed to hydrogen and said hydrogen vented; and sealing said container.

2. Method according to claim 1 wherein said current is passed through said cell by externally coupling said negative and positive plates.

3. Method according to claim 2 wherein said plates are externally coupled by a resistive load, and further wherein said current flow is terminated by uncoupling said load from said cell.

4. Method according to claim 1 wherein said positive plate comprises $Ni_3S_2$ or $NiS$.

5. Method according to claim 4 wherein said positive plate is clamped at a voltage between about 2.15 volts and 1.90 volts versus $Li/Li+$ while current passes through said cell.

6. Method of making an improved lithium-nickel sulfide battery comprising assembling a cell comprising a positive plate having $Ni_3S_2$ or $NiS$ as its active plate material, a negative plate comprising lithium as its active material and a non-aqueous electrolyte; externally coupling said positive and negative plates so that a current will flow through said cell and so that any water in said cell will react at said positive plate according to the reaction: $e^- + H_2O \rightarrow OH^- + \frac{1}{2}H_2$ (gas) and venting the hydrogen gas evolved at said positive plate from said cell; terminating flow of current through said cell by decoupling said plates, and hermetically sealing said cell.

References Cited

UNITED STATES PATENTS

| | | | |
|---|---|---|---|
| 3,413,154 | 11/1968 | Rao | 136—100 R |
| 3,427,202 | 2/1969 | Wilke | 136—100 R |
| 3,532,543 | 10/1970 | Nole et al. | 136—6 |

DONALD L. WALTON, Primary Examiner

U.S. Cl. X.R.

136—156